June 18, 1963  R. R. UHRMACHER  3,093,997
OIL VISCOSITY TESTER
Filed Nov. 20, 1958  2 Sheets-Sheet 1

INVENTOR
RALPH R. UHRMACHER
BY Richard H. Wynne
John A. Finken
ATTORNEYS

June 18, 1963  R. R. UHRMACHER  3,093,997
OIL VISCOSITY TESTER

Filed Nov. 20, 1958  2 Sheets-Sheet 2

INVENTOR
RALPH R. UHRMACHER
BY Richard G. Wynne
John A. Finken
ATTORNEYS

United States Patent Office 3,093,997
Patented June 18, 1963

3,093,997
OIL VISCOSITY TESTER
Ralph R. Uhrmacher, Fort Worth, Tex., assignor to Texas Refinery Corporation, Fort Worth, Tex., a corporation of Texas
Filed Nov. 20, 1958, Ser. No. 775,196
1 Claim. (Cl. 73—54)

This invention relates to methods for testing lubricating oil and to a test kit therefor. More specifically, the invention is directed to a kit and method for testing the condition of motor oil for viscosity, alkaline reserve and solids contamination.

The art has long sought a simple means for determining the proper time for changing motor oil. Prior art tests required sensitive and expensive laboratory equipment, technically trained operators, oil samples of considerable volume and the tests themselves were time-consuming. Accordingly, both individual motorists and operators of fleets of vehicles have employed arbitrary criteria to determine the time for changing oil, such as miles traveled, elapsed time between changes or hours of operation of the engine. These criteria often result in changing oil too frequently or too seldom because of the varied properties of the many oils commercially available, the differences in engine characteristics, and the differences in operating conditions and climates. As is apparent, changing oil before it has served its full useful life is uneconomical while operation of an engine with oil no longer having suitable properties may seriously damage the engine.

Accordingly, it is an object of the invention to provide a test kit and method which is economical, simple to utilize and which requires only minute quantities of oil to be tested.

It is another object of this invention to provide a test kit and method which reliably and accurately determines the condition of the oil being tested with respect to viscosity, pH and solids contamination.

A further object of the invention is to provide a test kit and method which requires only a few drops of oil from the crankcase dip-stick and which requires only a few minutes to determine the condition of the oil.

These and other objects of the invention will be apparent to those skilled in the art from the following description.

FIGURE 1 is a view of the oil test kit of the invention showing the components thereof.

FIGURES 2-14 illustrate the steps employed in the testing of oil utilizing the kit and method of the invention. Specifically, FIGS. 2-7 show the viscosity test; FIGS. 8-10 show the alkalinity or pH test; and FIGS. 12-14 show the contamination test.

Referring to Figure 1, a box 20 is provided with a sliding cover plate 21 which serves as the viscosity comparison means which is further described herein. A plurality of containers 22 contain unused standard oil of known viscosity characteristics. A rubber squeegee 23 is provided with a handle portion 24. A contamination comparison chart having indicia 26, 27 and 28 of different color densities is shown at 25. The reverse side of chart 25 (not shown in Figure 1) carries colored indicia corresponding to pH values for the indicator employed. The kit also includes a plurality of conventional filter papers 29, (shown folded) a plurality of fluid proof flexible bags 30 of plastic or the like and a rod 31 for dispensing drops of oil from bottles 22. A container containing a pH indicator is shown at 32.

The cover plate 21 is provided with a plurality of cone-like indentations 33, 34 and 35 for use in comparing the viscosity of the test oil with unused oil samples. The cone-shaped indentations are formed by boring into the plate 20 with a cone-shaped drill at an acute angle to the plate.

There will now be described the steps involved in testing a motor oil in an engine for its suitability with respect to viscosity, pH and solids contamination. For purposes of illustration, it will be assumed that the oil in the engine is SAE 30 oil which contains basic neutralizing agents intended to keep the pH of the oil above pH 5 throughout the effective life of the oil.

Figure 1:
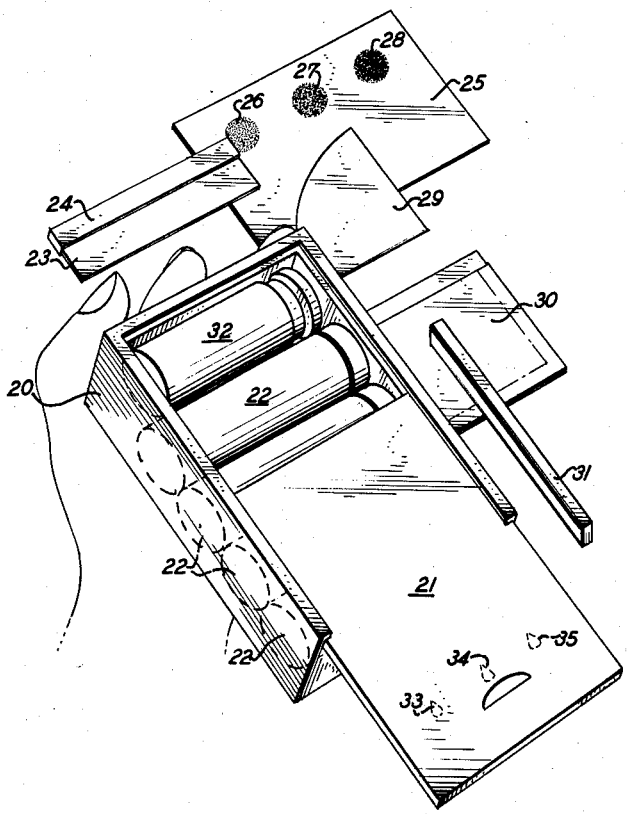
Figure 2:
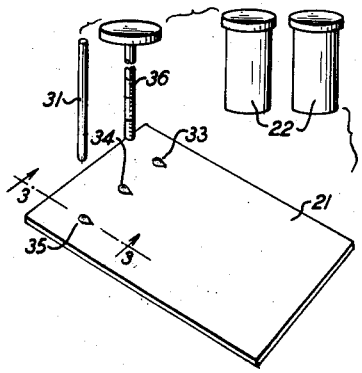
Figure 2 depicts the manner of utilizing the cover plate 21 to compare the viscosity of the test oil.
Figure 3:
Figure 3 is a cross-sectional view taken along lines 3—3 of Figure 2.
Figure 4:
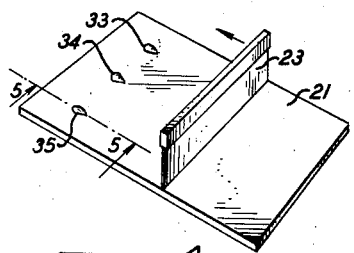
Figure 4 depicts wiping of the cover plate 21 with the squeegee 23.
Figure 5:
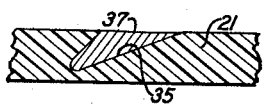
Figure 5 is a cross-sectional view taken along lines 5—5 of Figure 4.

The viscosity of the test oil is determined as follows. The plate 21 is placed on a level surface as shown in Figure 2 and a drop of test oil from the engine is applied to indentation 34 by means of the engine dip-stick 36. In similar fashion, a drop of standard SAE 20 oil is placed in indentation 35 and a drop of standard SAE 40 oil is placed in indentation 33 by means of rod 31. The standard oil of different viscosities is supplied with the kit in labeled containers 22. FIGURE 3 illustrates the position of the oil drop 37 in the cone-shaped depression 35. While the plate 21 is maintained on the level surface, the excess oil above the plate 21 is wiped off by wiping the squeegee 23 along the plate as shown in FIGURE 4. FIGURE 5 illustrates the oil in the conical depression 35 after the wiping operation. The conical indentations 33, 34 and 35 are accurately bored to insure that they are of identical size and it is apparent that after the excess is wiped off, equal volumes of oil will remain in each of the depressions 33, 34 and 35.

Figure 6:
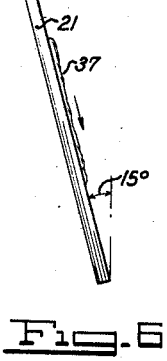
Figure 6 is a view in elevation of the plate 21 positioned for use in making the viscosity comparison.
Figure 7:
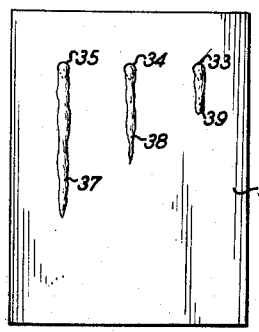
Figure 7 is a view in elevation of the plate 21, looking from the right of Figure 6.

The plate 21 is then elevated to about 15° from the vertical as shown in Figure 6 whereupon the oil filling the indentations runs down the plate in streams 37, 38 and 39 as shown in Figure 7. The rate at which the streams run from the holes is a measure of the viscosity of the respective oils. If the test oil 38 runs intermediate the rates of the SAE 20 oil 37 and the SAE 40 oil 39, it is apparent that its viscosity is in the range of SAE 30 and the test oil therefore passes the viscosity test. If, on the other hand, the test oil runs at a rate equal to or exceeding the rate of the SAE 20 oil, or as slowly as the SAE 40 oil, the motor oil should be drained and replaced.

The containers 22 preferably contain samples of fresh oil of a complete range of viscosities, for instance, from SAE 10 to SAE 40.

It will be apparent that the above-described viscosity comparison test is readily and simply performed by unskilled operators. The test is accurate and requires no elaborate temperature controls, etc., which were required in prior art viscosity measurements. The plate 21, preferably made of an inert plastic material, equalizes the temperature of the test oil and standard oil samples during the time required to perform the operations described above and hence gives an accurate measure of the viscosity of the test oil under any climatic conditions.

Figure 8:
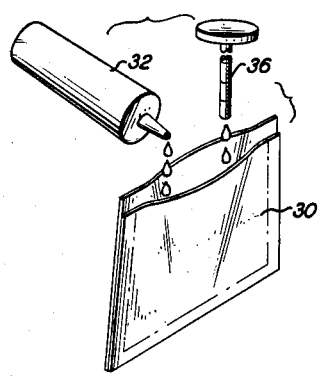
Figure 8 is a view of the use of the flexible bag 30 in making the pH test on the test oil.
Figure 9:
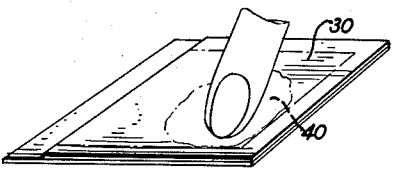
Figure 9 depicts mixing of the test oil and the indicator in the pH test.
Figure 10:
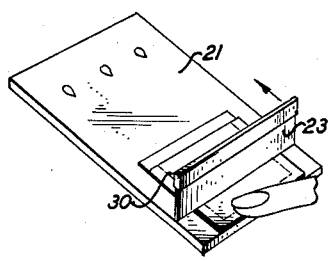
Figure 10 depicts removal of the test oil and indicator from the flexible bag in the pH test.
Figure 11:
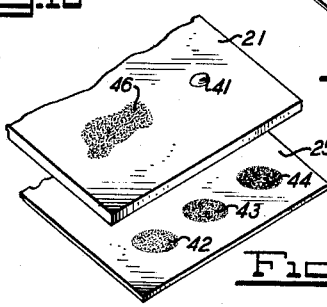
Figure 11 illustrates the comparison of the indicator with the color comparator chart in the pH test.

FIGURES 8–10 illustrate the steps utilized in performing the pH or alkaline reserve test. About two drops of test motor oil are placed in the flexible plastic bag 30 from the engine dip-stick 36 and several drops of the pH indicator are placed in the bag from the indicator container 32, as illustrated in FIGURE 8. In the case of the test oil described above, the indicator preferably comprises Brom Cresol Blue (Clark and Lubs Standard). The test oil and indicator in the bag are then thoroughly mixed, such as with the finger as shown in FIGURE 9. The mixture of oil and indicator is indicated by numeral 40. Thereafter, the oil and aqueous indicator are removed from the bag 30 by squeezing the same therefrom onto the plate 21 by means of the squeegee 23, as shown in FIGURE 10. The immiscible oil and indicator are thereby separated into a droplet of indicator 41 and the oil 46, as shown in FIGURE 11. The color of the indicator drop 41 is then compared with the colored pH indicia 42, 43 and 44 on comparison chart 25. In the case of Brom Cresol Blue, the indicator is blue above about pH 6, is green at about pH 5, and is yellow at about pH 3.8, and the colors 42, 43 and 44 on the chart 25 correspond thereto. Accordingly, if the droplet 41 is yellow, the motor oil has depleted its akali reserve (i.e. is too acid) and should be replaced in the engine. A blue droplet 41 indicates that the oil is satisfactory from a pH standpoint and a green droplet 41 is borderline, indicating that the oil has low alkaline reserve, but is probably satisfactory for a limited period.

It will be apparent that other aqueous indicators may be used for test oils having the equivalent amount of alkali present, such as Brom Cresol Green, Methyl Orange or Methyl Red. For motor oils having different alkalinities, other appropriate indicators may be used. With the use of other indicators, the colored indicia 42, 43 and 44 on the comparison card 25 should obviously conform to the color of the indicator for the appropriate pH values.

Figure 12:
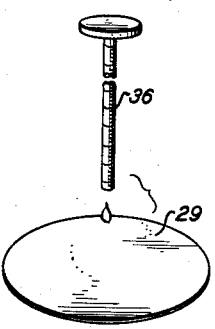
Figure 12 depicts placing test oil on a clean filter paper in the solids contamination test.
Figure 13:
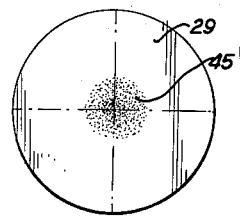
Figure 13 shows the filter paper after the test oil has been placed thereon.
Figure 14:
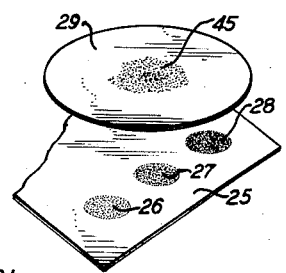
Figure 14 illustrates the comparison of the test oil on the filter paper with the contamination density chart in the solids contamination test.

The test for solids contamination of the test oil is illustrated in FIGURES 12–14. A drop of test oil is applied to filter paper 29 from the dip-stick 36, as illustrated in FIGURE 12. The oil spreads through the filter paper leaving a spot 45 of solid contaminants. The density of the spot 45 is then visually compared with standard graduated density indicia 26, 27 and 28, which indicate low medium and high solids contamination, respectively, as illustrated in FIGURE 14.

In practice, the three above-described tests may be begun simultaneously, as by placing drops of test oil from the dip-stick in an indentation in the viscosity comparator plate 21, in the flexible bag 30 and on the filter paper 29, respectively. While the test oil is being absorbed by the filter paper, the standard viscosity oils are placed in the cone-shaped indentations in the plate 21. The pH test may then be completed in the manner described above while the test oil and standard oils are coming to equal ambient temperature. At this point, the solids contamination may be determined and thereafter the viscosity test performed.

It is apparent that if the test motor oil fails in any one of the above tests, the oil should be drained from the engine and replaced. It also should be pointed out that the rod 31 should be wiped clean after applying one standard viscosity oil and before applying the second standard viscosity oil in order to avoid contamination of the standard oils.

The test kit and method is adaptable to use with any commercial motor oil, utilizing the same standard oils (except for viscosity) as is used in the engine and the appropriate pH indicator. The test kit and method thus permits any individual motorist or fleet operator to quickly and accurately determine the condition of motor oil and the proper time to change the oil. In addition, the test kit may be used by service station attendants to quickly determine whether the motor oil of a customer should be changed. It is apparent that it finds wide applicability to the testing of marine, aircraft, farm machinery, small gasoline engine-powered appliances and stationary engine lubricants as well as motor vehicle lubricants.

As pointed out above, the depressions or indentations 33, 34 and 35 in the viscometer plate 21 may be formed by drilling them into the plate which must be of substantial thickness to avoid complete penetration of the plate. Another method of forming the chambers 33, 34 and 35 involves punching a thermoplastic plate 21 with a heated conical tool and grinding the surface of the plate to present a plane surface. It is important that the volumes of the depressions or chambers be equal, and that the axis of each cone-shaped depression be less than 90° to the plane of the plate, said angle being measured between the direction of the flow path zone and the axis of the cone. It is also important that the said angles are equal for each depression or chamber.

While the invention has been described and depicted in the form of certain embodiments, these are intended to be illustrative rather than limiting and it is intended to cover such other modifications and embodiments that fall within the spirit and scope of the appended claim.

I claim:

A viscometer for comparing the viscosity of an oil with oil of known standard viscosity comprising a flat plate of substantial thickness having plurality of aligned open cone-like chambers therein, the bases of the cone-like chambers being at the surface of the plate and the central axes of the cone-like chambers being aligned at an acute angle to the plane of the plate, said plurality of cone-like chambers being of equal volume and the acute angles between the central axes of each chamber and the plane of the plate being equal.

References Cited in the file of this patent

UNITED STATES PATENTS

| | | |
|---|---|---|
| 1,266,149 | Penniman | May 14, 1918 |
| 1,637,386 | McClain | Aug. 2, 1927 |
| 1,721,809 | Buchanan | July 23, 1929 |
| 1,925,254 | John | Sept. 5, 1933 |
| 1,951,563 | Shivers | Mar. 20, 1934 |
| 2,302,224 | Jones | Nov. 17, 1942 |
| 2,625,817 | Oppenauer | Jan. 20, 1953 |